United States Patent
Martin et al.

(10) Patent No.: US 9,994,445 B2
(45) Date of Patent: Jun. 12, 2018

(54) SPHERICAL NANOPARTICLE HYDRIDES, AND METHODS FOR MAKING THE SAME

(71) Applicant: HRL Laboratories, LLC, Malibu, CA (US)

(72) Inventors: John H. Martin, Ventura, CA (US); Tobias A. Schaedler, Oak Park, CA (US); Brennan Yahata, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days. days.

(21) Appl. No.: 15/209,943

(22) Filed: Jul. 14, 2016

(65) Prior Publication Data

US 2017/0015550 A1    Jan. 19, 2017

Related U.S. Application Data

(60) Provisional application No. 62/192,569, filed on Jul. 15, 2015.

(51) Int. Cl.
*C01B 3/00* (2006.01)
*C01B 6/02* (2006.01)

(52) U.S. Cl.
CPC .............. *C01B 3/0084* (2013.01); *C01B 6/02* (2013.01); *Y02E 60/324* (2013.01)

(58) Field of Classification Search
CPC ........ C01B 3/0084; C01B 6/02; Y02E 60/324
USPC ....................................................... 428/402
See application file for complete search history.

(56) References Cited

PUBLICATIONS

Sheppard, Drew et al., Journal of Alloys and Compounds, 2010, vol. 492, Nos. 1-2, pp. L72-L74.*

Hogberg, Hans et al., Journal of Vacuum Science & Technology A, 2014, vol. 32, No. 4, article No. 041510, pp. 1-8.*
Zhu, Chunyu et al., Crystal Growth &Design, 2011, vol. 11, No. 9, pp. 4166-4174.*
Sheppard et al., "The Mechanochemical synthesis of magnesium hydride nanoparticles," Journal of Alloys and Compounds 2010, vol. 492, Nos. 1-2, pp. L72-L74.
Högberg et al., "Reactive sputtering of δ-ZrH2 thin films by high power impulse magnetron sputtering and direct current magnetron sputtering," Journal of Vacuum Science & Technology A 2014, 32, 041510.
Zhu et al., "Growth Mechanism for the Controlled Synthesis of MgH2/Mg Crystals via a Vapor-Solid Process," Crystal Growth & Design 2011, 11, 4166-4174.
Gharatloo et al., "Ultrasound-assisted synthesis of nano-structured zirconium hydride at room temperature," International Journal of Hydrogen Energy 40 (2015) 13942-13948.
International Search Report and Written Opinion (ISA/KR), PCT/US2016/042390, dated Oct. 20, 2016.

* cited by examiner

*Primary Examiner* — Leszek Kiliman
(74) *Attorney, Agent, or Firm* — O'Connor & Company (57) ABSTRACT

This invention describes spherical nanoparticle hydrides and a method for making them. A method of producing spherical nanoparticle hydrides comprises obtaining an electrically conductive or semiconductive wire fabricated from a base material capable of forming a hydride; exposing the wire to a hydrogen-containing processing gas under pressure; vaporizing the wire by electrical discharge, to generate a vapor phase; and reacting with hydrogen and condensing the vapor phase, generating a plurality of spherical nanoparticle hydrides. A composition of spherical nanoparticles is also provided, wherein each of the nanoparticles contains a base material that is electrically conductive or semiconductive and capable of forming a hydride, and hydrogen that is chemically or physically bonded with the base material, wherein the nanoparticles are characterized by a number-average particle diameter from 1 nanometer to 1000 nanometers, and wherein the nanoparticles are characterized by an average hydrogen content from 10 atom % to 85 atom %.

20 Claims, 5 Drawing Sheets

SPHERICAL NANOPARTICLE HYDRIDES, AND METHODS FOR MAKING THE SAME

PRIORITY DATA

This patent application is a non-provisional application with priority to U.S. Provisional Patent App. No. 62/192,569, filed Jul. 15, 2015, which is hereby incorporated by reference herein.

FIELD OF THE INVENTION

The present invention generally relates to spherical nanoparticle hydrides, and methods of making spherical nanoparticle hydrides.

BACKGROUND OF THE INVENTION

Nanoparticle hydrides can be manufactured through milling of existing hydrides or milling of metals which can be later exposed to hydrogen to form a hydride. Current methods for producing nanoparticle hydrides revolve around high-energy ball milling or condensation reactions from a heated material. In general, complex alloy hydrides must start from a mixed ingot, and then be processed into a workable material. Ingot materials have very low surface area and are very slow at hydrogen absorption. Milling these materials down can introduce contaminants and often takes hours to days to accomplish. In addition to this, milling must be done as a batch process—ultimately limiting the production rate compared to a continuous process.

Nanoscale hydrides can also be prepared by a number of different hydrogen-driven processes, such as hydrogen decrepitation, disproportionation-recombination, and metathesis reactions. A commercial scale hydrogen decrepitation process was originally developed to produce nanoscale rare earth alloys for high remanence and coercivity magnets (see Harris et al., "The hydrogen decrepitation of an $Nd_{15}Fe_{77}B_8$ magnetic alloy," *Journal of the Less Common Metals*, Volume 106, Issue 1, March 1985). More recently, a similar process was proposed to produce nanoscale hydrides (see Graetz et al., "Nanoscale Energy Storage Materials Produced by Hydrogen-Driven Metallurgical Reactions," *Adv. Eng. Mat.* 7, 597, 2005).

Gas-phase condensation and ballistic consolidation could also be used to prepare nanoparticles. This technique has been used to prepare nanoscale materials (Si and Ge) for lithium battery anodes (see Graetz et al., "Highly Reversible Lithium Storage in Nanostructured Silicon," *Electrochem. Solid-State Lett.*, 6, A194, 2003). In this process, a charge is heated in a tungsten basket or crucible and evaporated into a gas stream. The atoms cool rapidly and nucleate nanocrystals in the gas. The agglomerated nanoparticles become entrained in the gas and form a film of ballistically consolidated nanocrystals when they hit the substrate at high speed.

Improvements are desired for the commercial production of nanoparticle hydrides, which have many industrial uses.

SUMMARY OF THE INVENTION

The present invention addresses the aforementioned needs in the art, as will now be summarized and then further described in detail below.

The present invention provides spherical nanoparticle hydrides, and compositions comprising or consisting essentially of a plurality of spherical nanoparticle hydrides.

In some variations, a composition comprises a plurality of solid spherical nanoparticles, wherein each of the nanoparticles contains:

(i) a base material comprising an element, alloy, or compound, wherein the element, alloy, or compound is capable of forming a hydride, and wherein the base material is electrically conductive or semiconductive; and (ii) hydrogen that is chemically or physically bonded with the base material, wherein the nanoparticles are characterized by a number-average particle diameter from about 1 nanometer to about 1000 nanometers, and wherein the nanoparticles are characterized by an average hydrogen content from about 10 atom % to about 85 atom %.

In some embodiments, the number-average particle diameter is from about 1 nanometer to about 100 nanometers, or about 1 nanometer to about 10 nanometers.

The base material may include at least one element selected from alkali metals, alkaline earth metals, transition metals, or rare earth metals. In some embodiments, the base material consists of a single element. In other embodiments, the base material comprises an alloy of two or more metals, or an alloy containing at least one metal and at least one non-metal.

The nanoparticles may be characterized by an average hydrogen content from about 25 atom % to about 75 atom %, such as about 50 atom % to about 70 atom %.

In certain embodiments, the base material comprises zirconium, wherein the nanoparticles contain, on average, at least 50 atom % hydrogen that is chemically bonded with the zirconium as $ZrH_2$ and $ZrH_{1.5}$. Thus, provided herein is a zirconium hydride composition comprising a plurality of solid spherical nanoparticles that are characterized by a number-average particle diameter from about 1 nanometer to about 1000 nanometers, wherein the nanoparticles include zirconium hydride nanoparticles and optionally zirconium nanoparticles, and wherein the nanoparticles contain, on average, at least 50 atom % hydrogen that is chemically bonded with the zirconium as $Zr_x$ (x is about 1.5 to 2).

Variations of the invention also provide a method of producing solid spherical nanoparticle hydrides, the method comprising:

(a) obtaining an electrically conductive or semiconductive wire fabricated from a base material comprising an element, alloy, or compound, wherein the element, alloy, or compound is capable of forming a hydride;

(b) obtaining a processing gas containing from about 0.1 wt % to 100 wt % hydrogen;

(c) exposing the wire to the processing gas under a total pressure from about 1 bar to about 15 bar;

(d) vaporizing the wire by discharge of electrical current through the wire, to generate a vapor phase of the base material; and (e) simultaneously reacting the vapor phase with hydrogen and condensing the vapor phase, thereby generating a plurality of spherical nanoparticle hydrides, wherein the nanoparticles are characterized by an average particle diameter from about 1 nanometer to about 1000 nanometers and an average hydrogen content from about 10 atom % to about 85 atom %.

The base material may include at least one element selected from alkali metals, alkaline earth metals, transition metals, or rare earth metals. In some embodiments, the base material consists of a single element. In other embodiments, the base material comprises an alloy of two or more metals, or an alloy containing at least one metal and at least one non-metal. In certain embodiments, the base material includes a hydride.

In some embodiments, the processing gas contains at least 10 wt % hydrogen. When the processing gas contains less than 100 wt % hydrogen, the processing gas further contains a carrier gas, such as a gas selected from the group consisting of nitrogen, carbon dioxide, helium, neon, argon, krypton, xenon, and combinations thereof.

The wire may have a wire diameter of about 0.01 millimeter to about 3 millimeters. The wire may be disposed electrically with a capacitor bank having a rated voltage from about 1 kV to about 1000 kV and/or a capacitance of about 0.001 microfarad to about 100 farad. The electrical discharge vaporizes the wire quickly, such as within about 1 nanosecond to about 100 microseconds after the electrical current is supplied.

The method may be operated as a batch process, as a continuous process, or as a semi-continuous process, to produce solid spherical nanoparticle hydrides. The nanoparticle hydrides may be collected as a dry powder or a suspension of the solid spherical nanoparticle hydrides, for example.

DETAILED DESCRIPTION OF EMBODIMENTS OF THE INVENTION

The structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Variations of the invention are premised on the discovery of a process to make spherical nanoparticle hydrides. The present invention provides compositions comprising or consisting essentially of a plurality of spherical nanoparticle hydrides. This disclosure describes a method for the production of nanoparticle hydrides, with various techniques for the control of nanoparticle size, material composition, and hydrogen stoichiometry.

Nanoparticle hydrides are typically milled from larger powders or produced by hydrogen absorption of existing metallic nanoparticles. These methods inherently introduce contaminants such as oxygen or other materials from the processing vessels. By contrast, the present method utilizes wire vaporization in a hydrogen-containing atmosphere to produce nanoparticle hydrides of any hydride-forming composition. The hydrides condense from the vapor phase in a preferably contaminant-free environment, leading to extremely high-purity materials in a rapid, low-cost production route. Large volumes of spherical nanoparticle hydrides may be produced continuously. Spherical nanoparticles provide better flow characteristics and high surface/volume ratios, compared to existing methods of production.

Wire vaporization allows the production of complex alloy hydrides, which heretofore have been extremely difficult or impossible. This specification establishes a route to produce large quantities of ready-to-use complex alloy hydrides with extremely high ratios of surface area to volume. In some embodiments, the disclosure provides an improved high-capacity process for the production of current hydride materials.

In some variations, a composition comprises a plurality of solid spherical nanoparticles, wherein each of the nanoparticles contains:

(i) a base material comprising an element, alloy, or compound, wherein the element, alloy, or compound is capable of forming a hydride, and wherein the base material is electrically conductive or semiconductive; and (ii) hydrogen that is chemically or physically bonded with the base material, wherein the nanoparticles are characterized by a number-average particle diameter from about 1 nanometer to about 1000 nanometers, and wherein the nanoparticles are characterized by an average hydrogen content from about 10 atom % to about 85 atom %.

Note that "atom %" (or "at. %") means the percentage of one kind of atom relative to the total number of atoms. Thus in the case of hydrogen, atom % is the percentage of hydrogen atoms (as H) in the nanoparticle material. The nanoparticles may be characterized by an average hydrogen content from about 25 atom % to about 75 atom %, such as about 50 atom % to about 70 atom %. In other embodiments with a lower extent of hydriding, the nanoparticles are characterized by an average hydrogen content from about 0.1 atom % to about 10 atom %, such as about 1 atom % to about 5 atom %. In various embodiments of the invention, the nanoparticles are characterized by an average hydrogen content of about 0.1, 0.2, 0.3, 0.4, 0.5, 1, 2, 3, 4, 5, 6, 7, 8, 9, 10, 15, 20, 25, 30, 35, 40, 45, 50, 55, 60, 65, 70, 75, 80, 85, or 90 atom %.

In certain embodiments, the base material comprises zirconium, wherein the nanoparticles contain, on average, at least 50 atom % hydrogen that is chemically bonded with the zirconium as $ZrH_2$ and $ZrH_{1.5}$. Thus, provided herein is a zirconium hydride composition comprising a plurality of solid spherical nanoparticles that are characterized by a number-average particle diameter from about 1 nanometer to about 1000 nanometers, wherein the nanoparticles include zirconium hydride nanoparticles and optionally zirconium nanoparticles, and wherein the nanoparticles contain, on average, at least 50 atom % hydrogen that is chemically bonded with the zirconium as $ZrH_x$ (x is about 1.5 to 2); see Examples 1 and 2, and FIGS. 1, 2, 3A, 3B, and 4. $ZrH$, $ZrH_4$, and other zirconium hydride stoichiometries may also be present in the nanoparticles.

As intended herein, a "spherical nanoparticle" refers to nanoparticles created directly by wire vaporization followed by vapor condensation into a solid, which tends to create spheres due to surface-tension minimization. Any given particle may deviate from a perfect sphere, for various reasons. A sphere is a substantially round geometrical object in three-dimensional space. Thus "sphere," "spherical" and the like should be construed to mean not only perfectly spherical, but also approximately spherical in which one or more dimensions deviate from a perfect sphere by 10% or less, preferably 5% or less. Thus the nanoparticles may be ellipsoidal, spheroidal, ovoidal, etc. In some embodiments, the nanoparticles are characterized by an average sphericity—the ratio of the surface area of a sphere, with the same volume as the given particle, to the surface area of the given particle—of 1.0 (perfect sphere), 0.99, 0.98, 0.97, 0.96, 0.95, 0.94, 0.93, 0.92, 0.91, or 0.90.

The composition of spherical nanoparticle hydrides may contain particles that are not spheres. Non-spherical particles may be present due to the formation of sphere fragments, conjoined spheres, unvaporized wire fragments or regions (such as the wire ends), and so on. Preferably, a composition comprising spherical nanoparticle hydrides contains at least 75%, 80%, 85%, 90%, 95%, 96%, 97%, 98%, 99%, 99.5%, or 99.9% spherical nanoparticles on a mass basis.

The nanoparticles generally have a number-average diameter from about 1 nm to about 1 µm. In some embodiments, the number-average particle diameter is from about 1 nanometer to about 100 nanometers, or about 1 nanometer to about 10 nanometers. The nanoparticles, in some embodiments, have a number-average diameter from about 2 nm to about 500 nm, or about 5 nm to about 100 nm. In various embodiments, the nanoparticles have a number-average diameter of about 1, 2, 3, 4, 5, 6, 7, 8, 9, 10, 15, 20, 25, 30, 35, 40, 45, 50, 60, 70, 80, 90, 100 nm. In various embodiments, the nanoparticles have a number-average diameter of about 10, 50, 100, 150, 200, 250, 300, 350, 400, 450, 500, 550, 600, 650, 700, 750, 800, 850, 900, 950, or 1000 nm, including any intermediate range in increments of one nanometer.

For any particle in these calculations that is not a perfect sphere, the diameter is the effective diameter-the diameter of a sphere having the same volume as the given particle. In some embodiments, even when particles larger than 1000 nm are present, the number-average diameter of all particles present in the composition is still about 1 nm to about 1000 nm.

"Hydrides" include any material which includes hydrogen chemically bonded to, or physically bonded to (by absorption or adsorption), a base material. Typically, a hydride will include at least 0.1 atom % hydrogen, and more typically at least 1, 5, or 10 atom % hydrogen. Hydrides may include materials which may form new phases upon introduction of hydrogen, such as zirconium hydride and lithium hydride. There are atomic structures which have the ability to physically absorb a significant amount of hydrogen without a known phase change.

The base material (for making a hydride) may be chosen from any conductive or semi-conductive material, including pure elements or complex alloys. In some embodiments, the base material includes 1, 2, 3, 4, 5, or more elements. When more than one element is present, the base material may be an alloy in which one element is a metal and the other element is a non-metal, or an alloy in which two elements or metals, or an alloy with two metals and a non-metal, and so on. The base material may include at least one element selected from alkali metals, alkaline earth metals, transition metals, or rare earth metals.

In some embodiments, the base material comprises an element selected from the group consisting of Li, Na, K, Rb, Cs, Mg, Ca, Sr, Ba, and combinations thereof. In these or other embodiments, the base material comprises an element selected from the group consisting of Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and combinations thereof. The resulting nanoparticle hydrides are hydride forms of the base material.

In some embodiments, the base material consists of a single element. In other embodiments, the base material comprises an alloy of two or more metals, or an alloy containing at least one metal and at least one non-metal (e.g., C, O, N, or S). When more than one element is present in the base material, different degrees of hydriding may occur due to different reaction kinetics, as well as thermodynamics of hydride phase formation.

Variations of the invention also provide a method of producing solid spherical nanoparticle hydrides, the method comprising:

(a) obtaining an electrically conductive or semiconductive wire fabricated from a base material comprising an element, alloy, or compound, wherein the element, alloy, or compound is capable of forming a hydride;

(b) obtaining a processing gas containing from about 0.1 wt % to 100 wt % hydrogen;

(c) exposing the wire to the processing gas under a total pressure from about 1 bar to about 15 bar;

(d) vaporizing the wire by discharge of electrical current through the wire, to generate a vapor phase of the base material; and (e) simultaneously reacting the vapor phase with hydrogen and condensing the vapor phase, thereby generating a plurality of spherical nanoparticle hydrides, wherein the nanoparticles are characterized by an average particle diameter from about 1 nanometer to about 1000 nanometers and an average hydrogen content from about 10 atom % to about 85 atom %.

The base material may include at least one element selected from alkali metals, alkaline earth metals, transition metals, or rare earth metals. In some embodiments, the base material consists of a single element. In other embodiments, the base material comprises an alloy of two or more metals, or an alloy containing at least one metal and at least one non-metal. In certain embodiments, the base material includes a hydride.

The base material is electrically conductive or semiconductive, which herein means an electrical conductivity of the material, measured at 20° C., above $10^{-6}$ S/m, such as about $10^{-5}$ S/m, $10^{-4}$ S/m, $10^{-3}$ S/m, $10^{-2}$ S/m, $10^{-1}$ S/m, 1 S/m, 10 S/m, $10^2$ S/m, $10^3$ S/m, $10^4$ S/m, $10^5$ S/m, $10^6$ S/m, $10^7$ S/m, or more. Note that the final nanoparticle hydrides are not necessarily conductive or semiconductive; i.e., in some embodiments, the spherical nanoparticle hydrides high resistivity and thus low electrical conductivity (about $10^{-6}$ S/m or less). It is also noted that there is no perfect resistor and any material, when exposed to enough current, can ultimately be vaporized. Therefore, it is possible to use a starting base material that is not conductive or semiconductive.

"Wire vaporization" refers to the instant discharge of current through a wire to induce vaporization of the wire. Wire vaporization may also be referred to as wire atomization or pulsed wire discharge. In wire vaporization, the wire material quickly forms a vapor phase and/or plasma phase, followed by condensation into spherical droplets which solidify into solid spheres. Some of the wire material (e.g., at the wire ends) may remain in a liquid or solid phase, depending on overall conversion.

Wire vaporization may be accomplished with between 1 kV to 1 MV capacitors with a capacitance between 0.001 microfarad and 100 farads, for example. The exact power through the wire will depend on the desired particle size, size of the starting wire (diameter and length), material of the wire, and apparatus design. Wire vaporization may be completed on any wire size; however, less than 1 mm diameter and less than 10 cm in length are generally preferable, in view of power requirements. The principles of the invention apply to other geometries, such as rods, elongated plates, ribbon, coils, and so on.

Discharge should be completed between 1 nanosecond and 100 microseconds, but the exact discharge time is not regarded as critical, and typically will be significantly less than 1 second. The method may be run in batch processes with wires set-up in an array, or with continuous feeding of a wire between two electrodes, for example. The time between discharges can vary, depending on the apparatus and system.

The wire may have a wire diameter of about 0.01 millimeter to about 3 millimeters. The wire may have a wire length of about 1 millimeter to about 50 centimeters, preferably about 10 centimeters or less. The wire may be disposed electrically with a capacitor bank having a rated voltage from about 1 kV to about 1000 kV and/or a capacitance of about 0.001 microfarad to about 100 farad. The discharge vaporizes the wire quickly, such as within about 1 nanosecond to about 100 microseconds after the electrical current is supplied. The capacitor bank may be discharged using a spark gap switch, for example.

The processing gas should contain at least 0.1 wt % hydrogen, preferably at least 4 wt % hydrogen, and more preferably at least 10 wt % hydrogen. Using 100% hydrogen is acceptable, but poses a greater safety risk. The processing gas should be chosen based on the thermodynamics of hydride formation (i.e. more hydrogen for materials less likely to produce stable hydrides). In the event pure hydrogen is not being used, the processing gas includes a carrier gas which is inert or at least does not react more preferentially (compared to hydrogen) with the desired material. Nobel gases such as argon are the preferred carrier gas for the hydrogen. Nitrogen is acceptable as a carrier gas, in some embodiments. Generally, when the processing gas contains less than 100 wt % hydrogen, the processing gas further contains a carrier gas selected from nitrogen, carbon dioxide, helium, neon, argon, krypton, xenon, or combinations thereof.

In certain embodiments, the processing gas is applied in two steps. For example, the nanoparticles may be produced (by wire vaporization/condensation) in an inert gas and then exposed to a hydrogen-containing gas to form the hydride. Or the wire may be exposed to a first processing gas, containing hydrogen and a carrier gas, along with wire vaporization/condensation. Then the nanoparticles may be exposed to a second processing gas containing hydrogen, which may be a different hydrogen concentration compared to the first processing gas.

Typically, nanoparticles will have, on average, the same or nearly the same base composition of the wire they are vaporized from, plus additional absorbed hydrogen. In some cases, vaporization of lighter elements may lead to small shifts in total composition.

Oxygen or other oxidants should be avoided in the processing gas when it contains hydrogen. In embodiments which use a first processing gas containing an inert gas, it is possible to include oxygen to form a nanoparticle oxide, which is then later converted to a hydride with a second processing gas.

In certain embodiments, a mixture of hydrogen and carbon dioxide is employed as the processing gas. In these embodiments, the hydrogen and carbon dioxide may be obtained from a water-gas shift reaction of water and carbon monoxide. The processing gas may therefore contain residual amounts of water and carbon monoxide, in these particular embodiments.

It should also be noted that rather than hydrogen, its isotopes deuterium (D) or tritium (T) may be used, to form the deuterium or tritium equivalents of the spherical nanoparticle hydrides. Mixtures are also possible, i.e. mixtures of $H_2$, $D_2$, $T_2$, HD, HT, and DT may be used in the processing gas to produce spherical nanoparticle hydrides with various H/D/T content. As a specific example, zirconium deuteride, $ZrD_x$ (x is about 1.5 to 2) may be produced according to Examples 1 and 2, by replacing $H_2$ gas with $D_2$ gas.

The wire is preferably exposed to the processing gas under a total pressure from about 1 bar to about 15 bar. However, lower pressures than 1 bar (i.e., vacuum) or higher pressures than 15 bar may be employed. In some embodiments, the total pressure or the hydrogen partial pressure may be as low as 1 mtorr.

Without wishing to be bound by theory, the hydrogen concentration and total pressure (or specifically, the hydrogen partial pressure) should be selected such that there are a sufficient number of hydrogen molecules or atoms present in the region of wire-derived vapor, to enable hydride formation chemistry. The hydrogen concentration needs to be sufficient to allow mass transport—whether by diffusion, convection, or other mass transfer—to the wire-derived vapor on the fast timescale of vapor formation and condensation into spheres. The hydrogen concentration impacts not only hydride kinetics (unless $0^{th}$ order in hydrogen concentration), thermodynamics, and mass-transfer processes. Higher hydrogen partial pressures cause more hydrogen atoms or molecules to be present in the correct region of space. It is noted that at the very high temperatures resulting from wire vaporization, hydrogen molecules may be dissociated into two hydrogen atoms, and the hydrogen atoms may lose their electron to form positive ions (protons) as part of the high-temperature vapor or plasma phase.

The wire and processing gas need to be contained in some type of vessel, rather than open atmosphere. A vessel may be a reactor, tank, section of pipe, or other suitable apparatus. It has been discovered that pressure in the vessel is important to consistent production of nanoparticles. As mentioned above, maintaining the proper hydrogen partial pressure can control hydrogen content in the final nanoparticles. It has also been discovered that the total vessel pressure has significant impact on the size distribution of particles. In this vaporization and condensation process, the higher the pressure, the faster the material is allowed to cool and condense leading to smaller, more-uniform size distributions.

In the case where pure hydrogen is not used, a carrier gas may be selected to have the appropriate thermal conduction properties to facilitate faster heat flow out of the vaporization zone, thereby producing finer powders. For example, while not wishing to be bound by theory, the higher heat conduction of helium over argon means that at the same total pressure, a helium carrier gas would produce finer powders compared to an argon carrier gas. In this context, note that hydrogen has a high thermal conductivity (187 mW/m·K at 27° C.) and helium has a thermal conductivity of 157 mW/m·K at 27° C. while argon has a thermal conductivity of 18 mW/m·K at 27° C. In some embodiments, the overall processing gas has a thermal conductivity at least 50, 75, 100, 125, 150, or 175 mW/m·K (as measured at 27° C.).

In some embodiments, a method for producing spherical nanoparticle hydrides includes selecting a conducting wire of a composition which, when turned into a hydride, will have the desired composition of elements and hydrogen. The wire is placed in a wire vaporization apparatus with an appropriate processing gas and vaporized by intense resistive heating. Upon cooling from the vaporization, the elements condense into spherical nanoparticles containing the desired amount of hydrogen. The exact stoichiometry may be controlled through proper selection of wire and the partial pressure of hydrogen in the vaporization chamber. The particle size can be controlled by total gas pressure in the vessel (higher pressure gives smaller particles). This is attributed to faster condensation in the cooling gas. In some cases, the wire may already be (or include) a hydride, in which case the final hydrogen concentration may be increased or decreased, depending on the processing gas concentration and pressure in the chamber.

In the disclosed methods, various conversions, selectivities, and yields may be achieved. Conversion (%) refers to the mass percentage of starting wire that is vaporized. Hydride selectivity (%) refers to the mass percentage of vapor material that is converted to a hydride, as measured in the final spherical nanoparticles. Hydride yield (%) is conversion times selectivity, referring to the mass of nanoparticle hydrides as a percentage of the starting wire material.

In various embodiments, the wire conversion is at least about 50%, 60%, 70%, 80%, 90%, 95%, 99%, 99.5%, or 100%. In various embodiments, the hydride selectivity is at least about 20%, 30%, 40%, 50%, 60%, 70%, 80%, 90%, 95%, 99%, or 100%. Therefore the yield of nanoparticle hydrides in various embodiments is at least about 10%, 20%, 30%, 40%, 50%, 60%, 70%, 80%, 90%, 95%, 99%, or 100%.

The purity of the solid spherical nanoparticle hydrides may vary, depending on other materials present initially (with the base material), or contaminants in the base material, the processing gas, or the vessel (e.g., trace alloys from reactor walls). Generally speaking, the present invention is capable of producing solid spherical nanoparticle hydrides of high or very high purity. In various embodiments, the purity defined by (hydride material plus unhydrided base material) divided by (total final material) is at least about 80, 85, 90, 95, 96, 97, 98, 99, 99.5, or 99.9 wt %.

The method may be operated as a batch process, as a continuous process, or as a semi-continuous process, to produce solid spherical nanoparticle hydrides. The nanoparticle hydrides may be collected as a dry powder or as a suspension of the solid spherical nanoparticle hydrides, for example. Note that a surface oxide layer may form upon exposure of the nanoparticles to ordinary atmosphere or at a later time such as during pre-processing or final processing or commercial use of the nanoparticles. Also, surface-protection coatings may be added to the produced spherical nanoparticle hydrides, prior to shipment, if desired.

Any known apparatus capable of carrying out the disclosed methods may be utilized. One example is an apparatus as described in U.S. Pat. No. 6,972,115, which is hereby incorporated by reference herein.

Fast production of nanoparticle hydrides drastically increases the production rate for producing powders having nanoparticles assembled on the surface of microparticles, to activate sintering of bulk metallic parts, for example. The ability to select arbitrary compositions also makes it possible to investigate new opportunities in which nanoparticle hydrides may be useful, but have not been applicable to date due to the high cost of production.

The spherical nanoparticle hydrides may be incorporated onto the surface of micropowders, which may be characterized by an average microparticle size between about 1 micron to about 1 millimeter. As used herein, a "powder" or "micropowder" is a state of fine, loose particles. This invention is capable of altering the surface activity of micropowders, thereby enabling lower-temperature sintering of micropowders.

Microparticles with nanoparticle hydride coatings may be thermally activated to remove hydrogen from the nanoparticles, enabling surface reactions that enhance sintering of the microparticles. Nanoparticle hydride coatings can encourage oxide displacement on the surface of aluminum alloy powders, for example, allowing sintering at temperatures below the eutectic melting point or peritectic decomposition temperature. In addition to such oxide displacement, hydride nanoparticles may form eutectics at the microparticle surfaces, thereby inducing liquid-phase sintering throughout the powder bed.

Sintering aluminum powders is very difficult due to the tough oxide shell. Using nanoparticle hydride coatings on the surface of aluminum powder enables a surface breakdown of the oxide, allowing sintering at a lower processing temperature. Use of nanoparticle hydrides is important because of their relative air stability versus pure metal nanoparticles. For instance, zirconium nanoparticles are pyrophoric in air or undergo immediate oxidation rendering them inactive for the desired application, while zirconium hydride nanoparticles can be handled in air without issue.

As used herein, "metal microparticle" means a metal-containing particle or distribution of particles with an average diameter of less than 1 cm (typically less than 1 mm). The shape of these particles can vary greatly from spherical to aspect ratios of 100:1. The metal may be any metal or metal alloy which is solid above 50° C. The metal or metal alloy is preferably a different composition than the nanoparticle hydride that coats it. The metal or metal alloy may or may not have an oxide shell on the surface. Particles may be solid, hollow, or closed-cell foams. Some possible metal microparticles include, but are not limited to, aluminum, titanium, tungsten, or alloys of these metals.

As used herein, "non-metal microparticle" means a non-metal-containing particle or distribution of particles with an average diameter of less than 1 cm (typically less than 1 mm). The shape of these particles can vary greatly from spherical to aspect ratios of 100:1. The microparticle "aspect ratio" is defined as the ratio of the longest dimension to the shortest dimension in the microparticle.

Microparticles may be glass, ceramic, organic, or a composite material, for example. When not specified, a microparticle may be either a metal microparticle or a non-metal microparticle, or a combination thereof. Microparticles can be made through any means including but not limited to gas atomization, water atomization, and milling.

Some specific metal hydride nanoparticles may include, but are not limited to, titanium hydride, zirconium hydride, magnesium hydride, hafnium hydride, or alloys of these metals at various stoichiometric ratios of total hydrogen.

In some embodiments, the invention provides a microparticle coated with nanoparticles of a metal hydride. The metal hydride nanoparticles may include a metal or metal alloy hydride with a particle size less than 1 micron. Microparticles to be coated can be a different metal or alloy from the metal hydride, or another material such as a ceramic, glass, polymer, or composite material.

Microparticles may be solid, hollow, or closed cell in any shape. Microparticles are generally considered to be less than 1 mm in diameter. However, in some embodiments, a nanoparticle hydride coating may be applied to larger particles or structures, including particles up to 1 cm in diameter, or even larger.

The nanoparticle hydride coating may be 1 to 5 layers thick and is not necessarily continuous across the surface. Nanoparticles may attach to the surface using Van der Waals or electrostatic attraction between the nanoparticles and microparticles. In some cases, when the Van der Waals forces are strong enough, the coating may be applied without the use of solvents. For example, a gas mixing apparatus may be utilized, provided the gas does not react with the particles. The attraction may be improved by using organic ligands.

In some embodiments, the nanoparticle hydride coating consists of one composition of hydride on one composition of microparticle. In other embodiments, hydride compositions may be used to create the microparticle coating either through layering or simultaneous depositions. This may improve the desired reactions. Likewise, the coated microparticles may be of different compositions or materials. This may be used to create a mixed final product with variable powder properties through the product. It is also possible to combine multiple compositions of microparticles with layers of multiple compositions of nanoparticle hydrides. These may be produced simultaneously or through a stepwise fashion with a final mixing of structures at the end of processing, for example.

Some embodiments provide a method for attaching nanoparticle hydrides to a microparticle substrate. In some embodiments, nanoparticle hydrides are dissolved or suspended in a solvent and then microparticles are added to the suspension for a period of time to coat the microparticles with nanoparticles.

Particle attraction may be affected by the addition of salts, organic molecules, or acids and bases. The organic ligands may contain amine, carboxylic acid, thiol, or cyano functional groups, for example. These ligands may be added at any time during the process or to an individual component prior to final assembly. For instance, the microparticles may be mixed in a solvent with organic ligands to coat the microparticle surface with active charge sites prior to mixing with the metal hydride nanoparticles. Likewise, salts may be added with the nanoparticle hydrides prior to the addition of the microparticles.

A solvent is any liquid which can be used without substantial oxidation or reaction with the microparticle or nanoparticle hydride. The microparticles or nanoparticle hydrides should not be soluble in the solvent used. Preferably, the solvent does not change particle size, surface composition, particle composition, and/or reactivity of the particles. In preferred embodiments, the solvent is anhydrous, such as tetrahydrofuran (THF). In certain embodiments, water or a solvent with substantial water content may be applicable due to the stability of the particles. In some embodiments, a suspension is formed, i.e. a mixture of particles in solution which may eventually settle out after active mixing is stopped.

Solvents or solvent suspensions which contain organic ligands or other reactive species described above, which react with microparticles or nanoparticles, may be desirable to functionalize one or both of the particles prior to removal of the solvent and nanoparticle assembly. In some embodiments, functionalization alters the surface charge of the microparticle or nanoparticle. This may involve salt additions or attachment of organic ligands. Functionalization may be used to increase or decrease the attractive force between microparticles and nanoparticles to help control coating thickness and degree of coverage, for example.

Some embodiments employ organic ligands to assist in nanoparticle bonding to the microparticles. An organic ligand refers to any organic molecule or polymer which can be attached to the microparticle or nanoparticle to influence coating or assembly. The organic ligands may contain amine, carboxylic acid, thiol, or cyano functional groups. In some embodiments, these organic ligands may contain or be silanes. Some possible organic ligands include but are not limited to poly acrylic acid), poly (quaternary ammonium salts), poly (alkyl amines), poly (alkyl carboxylic acids) including copolymers of maleic anhydride or itaconic acid, poly(ethylene imine), poly(propylene imine), poly(vinylimidazoline), poly(trialkylvinyl benzyl ammonium salt), heparin, dextran sulfate, 1-carrageenan, pentosan polysulfate, mannan sulfate, chondroitin sulfate, poly(carboxymethylcellulose), poly(D- or L-Lysine), poly(L-glutamic acid), poly(L-aspartic acid), or poly(glutamic acid). Other organic ligands may include glycerol and aldehydes.

"Assembly" may refer to the act of nanoparticles coating the surface of a microparticle driven by an attractive force between the particles. A "coating" refers to nanoparticle hydrides attached or connected to the surface of a microparticle. This coating may be continuous or discontinuous and is characterized by greater than 0.25%, 1%, 5%, 10%, 25%, 50%, 75%, or 95% (or more, including 100%) surface area coverage of nanoparticle hydrides on a microparticle. The coating includes one and/or all subsequent layers of nanoparticle hydrides. A "layer" is defined as one coating step and may be between 5 nm and 100 microns thick in the coated areas. Multiple layers may exist.

In some embodiments, a plurality of nanoparticles forms a nanoparticle coating that is between about 5 nanometers to about 100 microns thick. The nanoparticle coating may contain a single layer or may contain multiple layers of the nanoparticles. In certain embodiments, the nanoparticle coating is continuous on the microparticles. In other embodiments, the nanoparticle coating is discontinuous on the microparticles.

Many compositions are possible. The microparticles may contain one or more metals selected from the group consisting of Li, Be, Ma, Mg, K, Ca, Sc, Y, Ti, Zr, Hf, V, Nb, Ta, Cr, Mo, W, Mn, Tc, Re, Fe, Ru, Os, Fe, Rh, Ir, Ni, Pd, Pt, Cu, Ag, Au, Zn, Cd, Al, Si, B, C, P, S, Ga, Ge, In, Sn, Sb, Pb, Bi, La, Ac, Ce, Th, Nd, U, and combinations or alloys thereof. In certain embodiments, the microparticles contain aluminum or an aluminum alloy. The microparticles typically do not contain any metals or metal alloys that are contained (in hydride form) in the nanoparticles.

The nanoparticles contain hydrogen and may (in some embodiments) contain one or more metals selected from the group consisting of Li, Be, Ma, Mg, K, Ca, Sc, Y, Ti, Zr, Hf, V, Nb, Ta, Cr, Mo, W, Mn, Tc, Re, Fe, Ru, Os, Fe, Rh, Ir, Ni, Pd, Pt, Cu, Ag, Au, Zn, Cd, Al, Si, B, C, P, S, Ga, Ge, In , Sn, Sb, Pb, Bi, La, Ac, Ce, Th, Nd, U, and combinations or alloys thereof. In certain embodiments, the nanoparticles contain titanium hydride, zirconium hydride, magnesium hydride, hafnium hydride, combinations thereof, or alloys of any of the foregoing.

The metal or metals present in the nanoparticles (as metal hydrides) may be the same or different than the metal or metals present in the microparticles. In certain embodiments, the nanoparticles contain the same metal—primarily in hydride form—that makes up the microparticles. That is, a metal M may be employed in the microparticles and the corresponding metal hydride $MH_x$ may be employed in the nanoparticles.

The amount of material in the nanoparticles, compared to the amount of material in the microparticles, may vary widely, depending on the particle sizes of nanoparticles and microparticles, the desired thickness of nanoparticle coating, and the desired surface coverage of nanoparticles (i.e. continuous or discontinuous). In various embodiments, the weight ratio of total metals contained in the nanoparticles divided by total metals contained in the microparticles is between about 0.001 to about 1, such as about 0.005, 0.01, 0.05, or 0.1, for example.

Other variations of the invention provide a material (e.g., powder) comprising a plurality of non-metallic microparticles that are at least partially coated with a plurality of nanoparticle hydrides, wherein the microparticles are characterized by an average microparticle size from between 1 micron to about 1 millimeter, and wherein the nanoparticles are characterized by an average nanoparticle size less than 1 micron.

In some embodiments, the average microparticle size is between about 10 microns to about 500 microns and/or the average nanoparticle size is between about 10 nanometers to about 500 nanometers.

The plurality of nanoparticles may form a single-layer or multiple-layer nanoparticle coating (on microparticles) that is between about 5 nanometers to about 100 microns thick, for example.

The non-metallic microparticles may contain one or more materials selected from the group consisting of a glass, a ceramic, an organic structure, a composite, and a combination thereof The nanoparticles contain hydrogen and may contain one or more metals selected from the group consisting of Li, Be, Ma, Mg, K, Ca, Sc, Y, Ti, Zr, Hf, V, Nb, Ta, Cr, Mo, W, Mn, Tc, Re, Fe, Ru, Os, Fe, Rh, Ir, Ni, Pd, Pt, Cu, Ag, Au, Zn, Cd, Al, Si, B, C, P, S, Ga, Ge, In , Sn, Sb, Pb, Bi, La, Ac, Ce, Th, Nd, U, and combinations or alloys thereof.

The microparticles may include a plurality of hollow shapes selected from the group consisting of spheres, cubes, rods, octets, irregular shapes, random shapes, and combinations thereof. In some embodiments, the microparticles are hollow microspheres. Hollow microspheres are structures that encompass a small closed volume. Typically a thin shell contains a small amount of gas (e.g., air, an inert gas, or a synthetic mixture of gases) that may be at a pressure below one atmosphere. Since air and other gases are excellent thermal insulators and have very low heat capacity compared to any solid material, hollow microspheres can provide low thermal conductivity and low heat capacity. The hollow microspheres may also contain empty space, i.e. vacuum or near vacuum.

The hollow shapes may have an average maximum dimension of less than 0.2 mm and an average ratio of maximum dimension to wall thickness greater than 5. For example, the hollow shapes may have an average maximum dimension of about, or less than about, 100 μm, 50 μm, 20 μm or 10 μm. Also, the hollow shapes may have an average ratio of maximum dimension to wall thickness of about, or greater than about, 10, 15, 20, or 25. The wall thickness need not be uniform, either within a given shape or across all shapes. Hollow shapes, compared to perfect spheres, may contain more or less open space between shapes, depending on packing configuration. The spheres (or other shapes), in other embodiments, are not hollow or only partially hollow, i.e. porous. The spheres (or other shapes) may be bonded together with an adhesive and/or embedded in a matrix material. In certain embodiments, the spheres (or other shapes) are sintered together without an adhesive or matrix material. It is possible to combine these techniques so that a portion of shapes are bonded together with an adhesive or matrix material while another portion of shapes are sintered together without an adhesive or matrix material.

In various embodiments, the microparticles are spherical or sphere-like, spheroidal, ellipsoidal, or rod or rod-like microstructures. When hollow, the microparticles may contain empty space or may contain air or another gas, such as argon, nitrogen, helium, carbon dioxide, etc.

The microparticles may include a polymer, ceramic, or metal, for example. In some embodiments, the microparticles contain a glass, $SiO_2$, $Al_2O_3$, $AlPO_4$, or a combination thereof. In some embodiments, the microparticles contain polyethylene, poly(methyl methacrylate), polystyrene, polyvinylidene chloride, poly(acrylonitrile-co-vinylidene chloride-co-methyl methacrylate), or a combination thereof. The microparticles may include carbon, a thermally treated organic material, or a carbonized organic.

Possible microparticles also include hollow glass spheres, hollow aluminum phosphate spheres, hollow alumina spheres, hollow zirconia spheres, other ceramic hollow spheres, hollow polyethylene spheres, hollow polystyrene spheres, hollow polyacrylate spheres, hollow polymethacrylate spheres, or hollow thermoplastic microspheres containing polymers such as vinylidene chloride, acrylo-nitrile or methyl methacrylate. While spherical shapes may be preferred, other geometries in the aforementioned materials may also be utilized.

Closed-cell microparticles (employed in some embodiments) have closed porosity. By "closed porosity" it is meant that the majority of the porosity present in the microstructure results from closed pores that do not permit fluid flow into or through the pores. By contrast, "open porosity" results from open pores that permit fluid flow into and out of the pores. The total porosity of the microstructure is the sum of open porosity (measurable by intrusion methods, e.g. mercury intrusion) and closed porosity (measurable by microscopic image analysis or calculable from Archimedes measurements, when the bulk density is measured and the theoretical density is known).

In some embodiments, a method for depositing metal hydride nanoparticles on a metallic micropowder comprises a first step of suspending metal hydride nanoparticles in an anhydrous solvent. Microparticles are added to the suspension of nanoparticles. The metal hydride nanoparticles are assembled on the microparticles, and the solvent is removed. In these or other embodiments, the microparticles are present in an anhydrous solvent and then the metal hydride nanoparticles are added to the mixture. Methods for depositing metal hydride nanoparticles on a non-metallic micropowder are similar.

Some variations provide a microparticle with multiple layers and one outer layer containing or consisting of nanoparticles. The outer shell may be made continuous (e.g., fused together, as defined below) rather than being formed from discrete nanoparticles, thereby improving durability and structural rigidity.

The nanoparticles may be dispersed in a matrix. Layers of nanoparticles may be separated by an organic or oxide material. The coating on the microparticles may also include nanoparticles fused together to form a solid layer on the surface.

In some embodiments of the invention, the nanoparticles are fused together to form a continuous coating. As intended in this specification, "fused" should be interpreted broadly to mean any manner in which nanoparticles are bonded, joined, coalesced, or otherwise combined, at least in part, together. Many known techniques may be employed for fusing together nanoparticles.

In various embodiments, fusing is accomplished by sintering, heat treatment, pressure treatment, combined heat/pressure treatment, electrical treatment, electromagnetic treatment, melting/solidifying, contact (cold) welding, solution combustion synthesis, self-propagating high-temperature synthesis, solid state metathesis, or a combination thereof In certain embodiments, fusing is accomplished by sintering of nanoparticles. "Sintering" should be broadly construed to mean a method of forming a solid mass of material by heat and/or pressure without melting the entire mass to the point of liquefaction. The atoms in the materials diffuse across the boundaries of the particles, fusing the particles together and creating one solid piece. The sintering temperature is typically less than the melting point of the material. In some embodiments, liquid-state sintering is used, in which at least one but not all elements are in a liquid state.

When sintering or other heat treatment is utilized, the heat or energy may be provided by electrical current, electromagnetic energy, chemical reactions (including formation of ionic or covalent bonds), electrochemical reactions, pressure, or combinations thereof. Heat may be provided for initiating chemical reactions (e.g., to overcome activation energy), for enhancing reaction kinetics, for shifting reaction equilibrium states, or for adjusting reaction network distribution states.

In some embodiments, a sintering technique (for fusing together nanoparticles) may be selected from the group consisting of radiant heating, induction, spark plasma sintering, microwave heating, capacitor discharge sintering, and combinations thereof.

In some variations, nanoparticle hydride-coated microparticles are used in standard powder metallurgy processes to create a solid or foam metal structure. This has the advantage of providing microparticles with sintering aids in direct contact with the microparticles in an even distribution throughout the powder pack. These hydrides act as sintering aids by decomposing at elevated temperatures, leaving reactive metal nanoparticles on the surface of the metal microparticles and thus inducing favorable sintering reactions. Some of these favorable sintering reactions may include, but are not limited to, oxide displacement and eutectic formation for liquid-phase sintering. Metal hydrides and metal alloy hydrides typically have relatively low melting points, i.e. lower than the corresponding (non-hydride) metals or metal alloys.

In addition to this, the decomposition of the hydrides provides a protective reducing atmosphere throughout the heated powder to prevent oxidation during sintering. The metal hydride nanoparticles can also act as strengthening agents. Possible methods for strengthening the sintered material include, but are not limited to, formation of particulate inclusions, solid solution alloying, grain refining agents, and precipitation strengthening.

If nanoparticle hydrides are used in excess, they can act both as a way to form a reducing atmosphere and act as a blowing agent for the production of metallic foams. The even distribution of hydrides throughout the powder pack may help establish a good cell distribution in the resulting foam.

Some possible powder metallurgy processing techniques that may be used include, but are not limited to, hot pressing, sintering, high-pressure low-temperature sintering, extrusion, metal injection molding, and additive manufacturing.

A sintering technique may be selected from the group consisting of radiant heating, induction, spark plasma sintering, microwave heating, capacitor discharge sintering, and combinations thereof. Sintering may be conducted in the presence of a gas, such as air or an insert gas (e.g., Ar, He, or $CO_2$), or in a reducing atmosphere (e.g., $H_2$ or CO). Sintering $H_2$ may be provided by decomposition of the hydride coating.

Various sintering temperatures or ranges of temperatures may be employed. A sintering temperature may be about, or less than about, 100° C., 200° C., 300° C., 400° C., 500° C., 600° C., 700° C., 800° C., 900° C., or 1000° C.

In some embodiments employing (single) metal microparticles, a sintering temperature is preferably less than the metal melting temperature. In some embodiments employing metal alloy microparticles, a sintering temperature may be less than the maximum alloy melting temperature, and further may be less than the minimum alloy melting temperature. In certain embodiments, the sintering temperature may be within the range of melting points for the selected alloy. In some embodiments, a sintering temperature may be less than a eutectic melting temperature of the microparticle alloy.

At a peritectic decomposition temperature, rather than melting, a metal alloy decomposes into another solid compound and a liquid. In some embodiments, a sintering temperature may be less than a peritectic decomposition temperature of the microparticle metal alloy.

If there are multiple eutectic melting or peritectic decomposition temperatures, a sintering temperature may be less all of these critical temperatures, in some embodiments.

In some embodiments pertaining to aluminum alloys employed in the microparticles, the sintering temperature is preferably selected to be less than about 450° C., 460° C., 470° C., 480° C., 490° C., or 500° C. The decomposition temperature of peritectic aluminum alloys is typically in the range of 400-600° C. (Belov et al., *Multicomponent Phase Diagrams: Applications for Commercial Aluminum Alloys*, Elsevier, 2005), which is hereby incorporated by reference herein. Melting temperatures, eutectic melting temperatures, and peritectic decomposition temperatures for various alloys can be found in MatWeb (www.matweb.com), a searchable online database of engineering materials with over 100,000 data sheets, which is hereby incorporated by reference herein.

In conventional powder metallurgy processes, the resulting structures derived from these nanoparticle hydride-coated particles would be unique. The surrounding nanoparticles may be observed as inclusions and/or act to restrict grain growth beyond the original volume of the coated microparticle. While grain growth may be limited to the inclusion boundaries, it would be possible to have grains within the inclusion boundary. This could arise for many reasons, such as if the micropowder used is already polycrystalline and/or the material is work-hardened. These inclusions could range from about 10 nm to 1 micron, for example, and be composed of an oxide, metal, and/or metal alloy.

Optionally, the material could be fully normalized to dissolve the desired inclusions. Normalization is the process of fully solutionizing the metal. This would mask the original sintered structures. The expected grain growth of the material during this process would drastically reduce the material's overall strength and require substantial post working.

In additive manufacturing (laser melting and electron beam melting), due to the melt pool formation, the structures may lack some of the aforementioned characteristic features. For example, random nucleation may be present. Not wishing to be bound by theory, the nanoparticles may act as either insoluble inclusions or composition gradients in the melt pool during processing. Due to the fast rate of cooling in additive manufacturing, this will induce nucleation at these points, creating a unique structure. This may promote equiaxed grain growth and decrease the tendency towards columnar and preferential grain growth currently observed in additive manufacturing.

Some variations provide a solid article comprising at least 0.25 wt % of a material containing a plurality of metal-containing or metal alloy-containing microparticles that are at least partially coated with a plurality of metal hydride or metal alloy hydride nanoparticles, wherein the nanoparticles form continuous or periodic inclusions at or near grain boundaries between the microparticles.

A solid article may be, for example, a coating, a coating precursor, a substrate, a billet, a net shape part, a near net shape part, or another object.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

EXAMPLES

These Examples 1 and 2 pertain to the application of the methods and principles disclosed herein to produce zirconium hydride nanoparticles.

Similar to other metal hydrides, different crystalline phases of zirconium hydrides exist. The known $ZrH_x$ phases are $\gamma(x=1)$, $\delta(x=1.5\text{-}1.65)$, and $\epsilon(x=1.75\text{-}2)$. Zr itself is assigned $\alpha(x=0)$. Fractional x values often correspond to mixtures, so compositions with $x=0.8\text{-}1.5$ usually contain a mixture of $\alpha$, $\gamma$ and $\delta$ phases; and $\delta$ and $\epsilon$ phases typically coexist for $x=1.65\text{-}1.75$.

Example 1

Production of Nanoparticle Zirconium Hydrides

Four 0.25-mm diameter, 3-inch length zirconium (99.2 wt %) wires are loaded into a sealed vessel with electrical contacts made externally with a capacitor bank. The sealed vessel is evacuated and purged with 100% hydrogen gas to eliminate the presence of undesired gases. The sealed vessel is brought to a final pressure of 7 psi of 100% hydrogen gas.

Zirconium wires are then separately vaporized by capacitive discharge utilizing a 5 kV, 1250 J capacitor bank with a spark gap switch in the presence of the hydrogen gas (which reacts with Zr vapor), inducing the condensation of zirconium and zirconium hydride particles. The pressure of hydrogen gas in the sealed vessel is not maintained at 7 psi after each individual wire vaporization, thus decreasing the hydrogen content in the sealed vessel's atmosphere after each wire vaporization. Particles are subsequently collected from the bottom of the vessel, where agglomerated particles settled, to be examined by scanning electron microscopy and X-ray diffraction.

Figure 1:
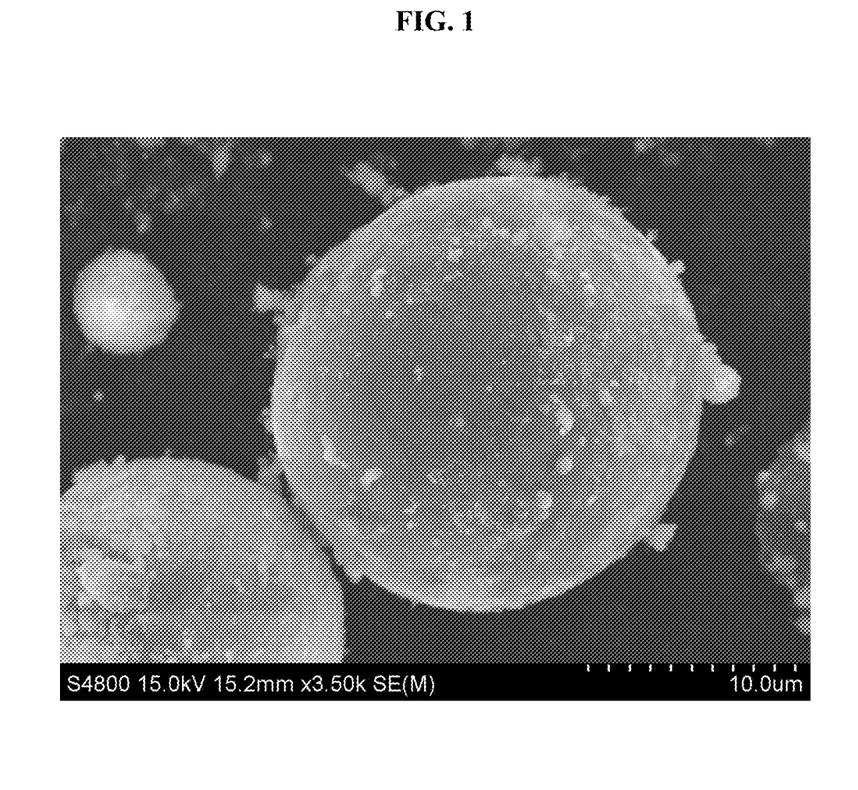
FIG. 1 is a SEM image of zirconium and zirconium hydride particles, in Example 1.

FIG. 1 shows a SEM image of zirconium and zirconium hydride particles. As observed in FIG. 1, scanning electron microscopy confirms the particle sizes of zirconium and zirconium hydride particles are from <100 nanometers and 30 micrometers.

Figure 2:
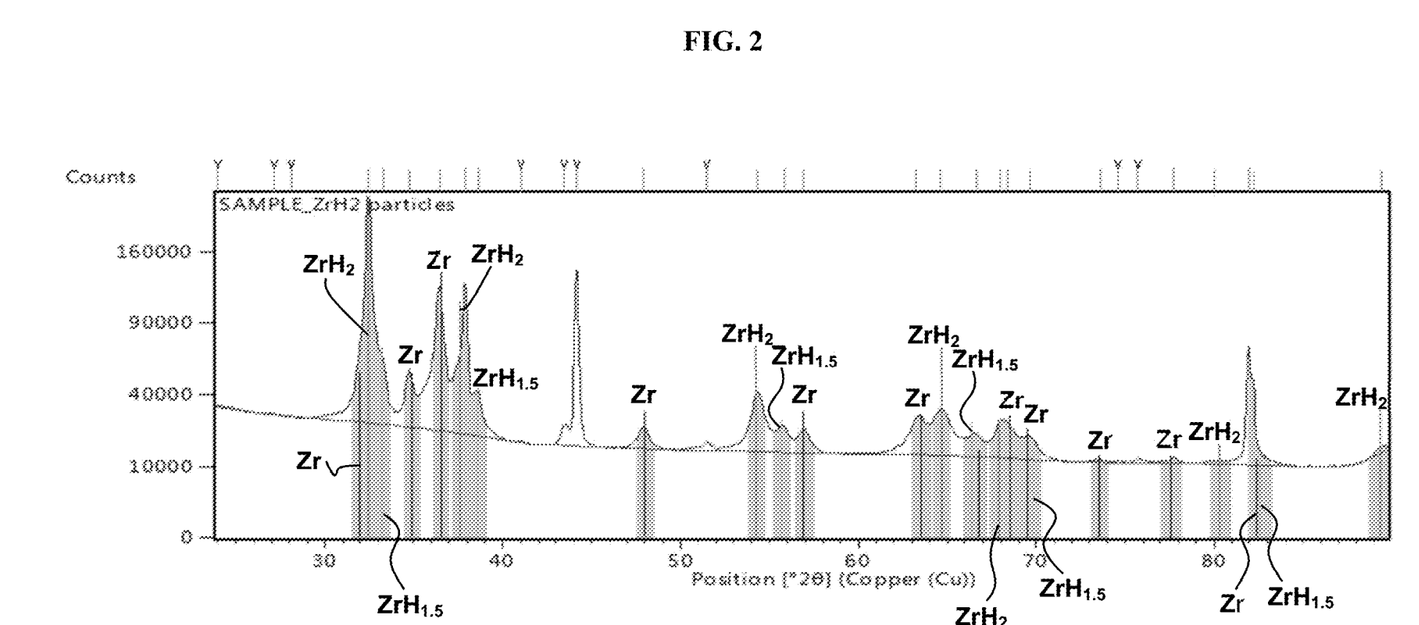
FIG. 2 is a graph of XRD data for zirconium and zirconium hydride particles, in Example 1.

FIG. 2 shows XRD data of zirconium and zirconium hydride particles from the 7 psi hydrogen condition. Lines are indicated for $ZrH_{1.5}$, $ZrH_2$, and zirconium. X-ray diffraction confirms the presence of zirconium and zirconium hydrides plus unidentified peaks associated with contamination from previous experiments. The content ratio of $ZrH_2$ to Zr is 60 to 40.

Example 2

Production of Nanoparticle Zirconium Hydrides

To show the effect of hydrogen content on the size distribution and content ratios of zirconium and zirconium hydride particles formed from wire vaporization, an experiment with comparable conditions to Example 1 is performed. Four 0.25-mm diameter, 3-inch length zirconium (99.2 wt %) wires are loaded into a sealed vessel with electrical contacts made externally with a capacitor bank. The sealed vessel is evacuated and purged with 100% hydrogen gas to eliminate the presence of undesired gases. The sealed vessel is brought to a higher final pressure than in the previous example, namely, here at 11 psi of 100% hydrogen gas. Each zirconium wire is then separately vaporized by electrical discharge, as in Example 1, in the presence of the hydrogen atmosphere, thereby condensing into zirconium and zirconium hydride particles. The pressure of hydrogen gas is maintained at 11 psi between each individual wire vaporization by refilling the sealed vessel to 11 psi of hydrogen gas. Particles are similarly collected from the bottom of the vessel.

Figure 3A:
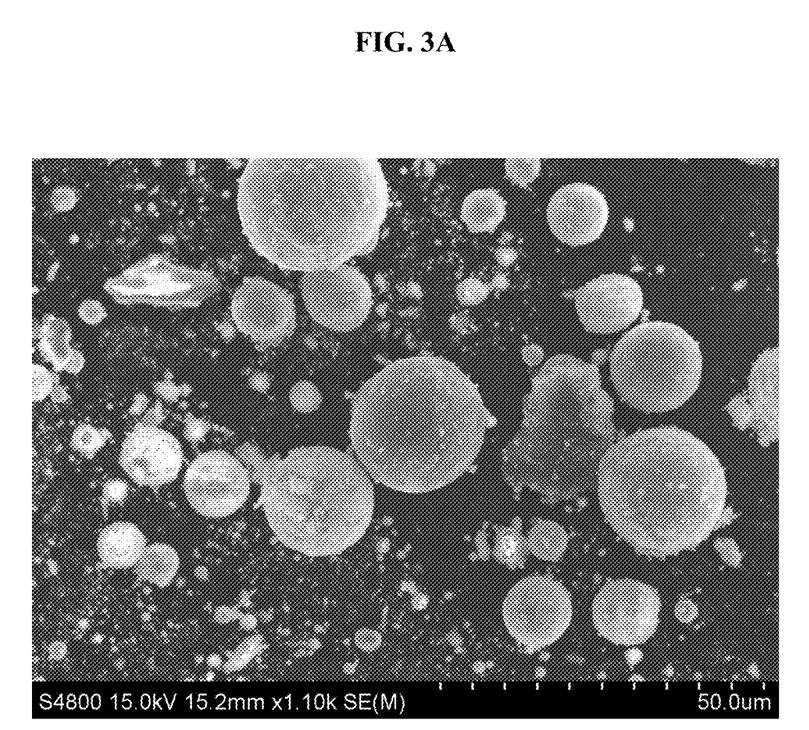
FIG. 3A is a SEM image of zirconium and zirconium hydride particles condensed from wire vaporization in 7 psi hydrogen, in Example 2.
Figure 3B:
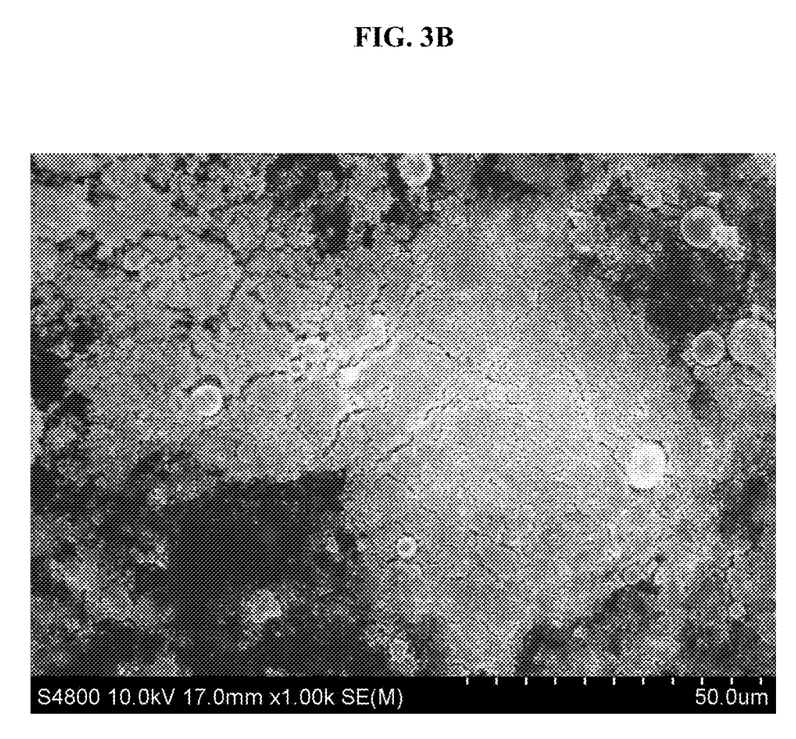
FIG. 3B is a SEM image of zirconium and zirconium hydride particles condensed from wire vaporization in 11 psi hydrogen, in Example 2.

FIG. 3A shows a SEM image of zirconium and zirconium hydride particles condensed from wire vaporization in 7 psi without maintaining pressure. FIG. 3B shows a SEM image of zirconium and zirconium hydride particles condensed from wire vaporization in 11 psi with maintaining pressure. The SEM images in FIGS. 3A and 3B visually compare the size distributions from the two different hydrogen content conditions. In FIG. 3A, a higher content of larger particles is formed in the depleted hydrogen atmosphere, whereas a higher content of smaller particles in FIG. 3B is observed when the hydrogen content is higher and maintained between each wire vaporization. Hydrogen content and/or total pressure can be used to control size distribution of the particles formed from a wire vaporization by controlling the partial pressure of hydrogen.

Figure 4:
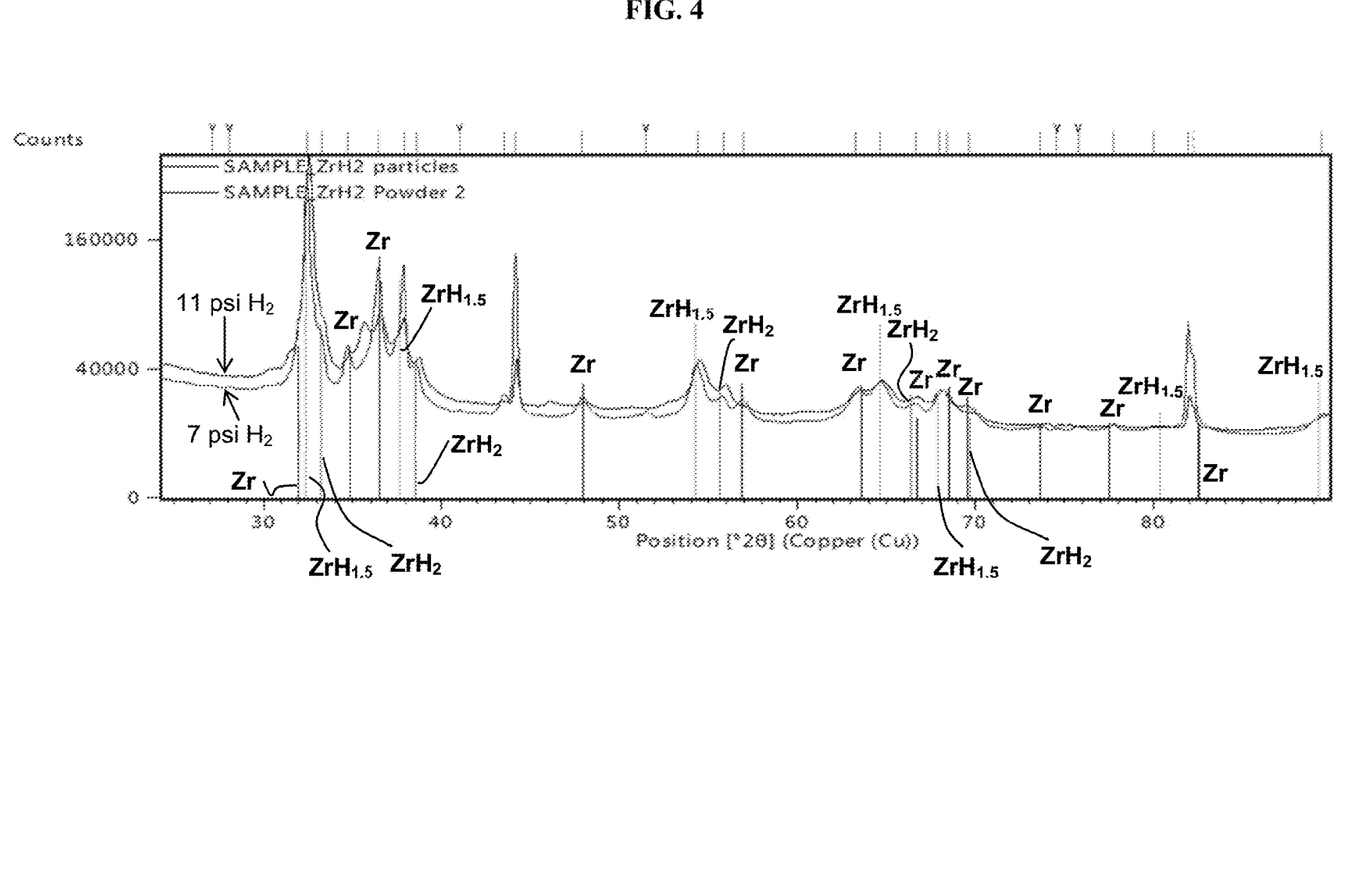
FIG. 4 is a graph of XRD data for zirconium and zirconium hydride particles, in Example 2.

FIG. 4 shows XRD comparison data from two hydrogen atmosphere conditions. Lines are shown for $ZrH_{1.5}$, $ZrH_2$, and zirconium. A comparison of the XRD data from both conditions reveals that the content ratio of $ZrH_2$ to Zr is 80 to 20 in the constant 11 psi hydrogen atmosphere, compared a smaller ratio of $ZrH_2$ to Zr of 60 to 40 in the decreasing 7 psi hydrogen atmosphere. The higher $ZrH_2$ content in the particles formed in the constant 11 psi hydrogen atmosphere is driven by the higher hydrogen content that favors the formation of $ZrH_2$ particles. The yield of $ZrH_2$ particles can be adjusted by controlling the hydrogen content or $H_2$ partial pressure in the processing gas.

What is claimed is:

1. A composition comprising a plurality of solid spherical nanoparticles, wherein each of said solid spherical nanoparticles contains:
   (i) a base material comprising an element, alloy, or compound, wherein said element, alloy, or compound is capable of forming a hydride, and wherein said base material is electrically conductive or semiconductive; and
   (ii) hydrogen that is chemically or physically bonded with said base material,
   wherein said solid spherical nanoparticles are characterized by a number-average particle diameter from about 1 nanometer to about 1000 nanometers, and
   wherein said solid spherical nanoparticles are characterized by an average hydrogen content from about 10 atom % to about 85 atom %.

2. The composition of claim 1, wherein said number-average particle diameter is from about 1 nanometer to about 100 nanometers.

3. The composition of claim 1, wherein said number-average particle diameter is from about 1 nanometer to about 10 nanometers.

4. The composition of claim 1, wherein said base material comprises at least one element selected from alkali metals, alkaline earth metals, transition metals, or rare earth metals.

5. The composition of claim 1, wherein said base material consists of a single element.

6. The composition of claim 1, wherein said base material comprises an alloy of two or more metals.

7. The composition of claim 1, wherein said solid spherical nanoparticles are characterized by an average hydrogen content from about 25 atom % to about 75 atom %.

8. The composition of claim 1, wherein said solid spherical nanoparticles are characterized by an average hydrogen content from about 50 atom % to about 70 atom %.

9. The composition of claim 1, wherein said base material comprises zirconium, wherein said solid spherical nanoparticles contain, on average, at least 50 atom % hydrogen that is chemically bonded with said zirconium as $ZrH_2$ and $ZrH_{1.5}$.

10. A zirconium hydride composition comprising a plurality of solid spherical nanoparticles that are characterized by a number-average particle diameter from about 1 nanometer to about 1000 nanometers, wherein said solid spherical nanoparticles include zirconium hydride solid spherical nanoparticles and optionally zirconium solid spherical nanoparticles, and wherein said solid spherical nanoparticles contain, on average, at least 50 atom % hydrogen that is chemically bonded with said zirconium as $ZrH_x$ (x is about 1.5 to 2).

11. A method of producing solid spherical nanoparticle hydrides, said method comprising:
   (a) obtaining an electrically conductive or semiconductive wire fabricated from a base material comprising an element, alloy, or compound, wherein said element, alloy, or compound is capable of forming a hydride;
   (b) obtaining a processing gas containing from about 0.1 wt % to 100 wt % hydrogen;
   (c) exposing said wire to said processing gas under a total pressure from about 1 bar to about 15 bar;
   (d) vaporizing said wire by discharge of electrical current through said wire, to generate a vapor phase of said base material; and
   (e) simultaneously reacting said vapor phase with hydrogen and condensing said vapor phase, thereby generating a plurality of solid spherical nanoparticle hydrides,
   wherein said solid spherical nanoparticle hydrides are characterized by an average particle diameter from about 1 nanometer to about 1000 nanometers and an average hydrogen content from about 10 atom % to about 85 atom %.

12. The method of claim 11, wherein said processing gas contains at least 10 wt % hydrogen.

13. The method of claim 11, wherein said processing gas contains less than 100 wt % hydrogen, and wherein said processing gas further contains a carrier gas selected from the group consisting of nitrogen, carbon dioxide, helium, neon, argon, krypton, xenon, and combinations thereof.

14. The method of claim 11, wherein said wire has a wire diameter of about 0.01 millimeter to about 3 millimeters.

15. The method of claim 11, where said wire is disposed electrically with a capacitor bank having a rated voltage from about 1 kV to about 1000 kV.

16. The method of claim 14, where said capacitor bank has a capacitance of about 0.001 microfarad to about 100 farad.

17. The method of claim 11, wherein said discharge vaporizes said wire within about 1 nanosecond to about 100 microseconds after said electrical current is supplied.

18. The method of claim 11, wherein said base material includes a hydride.

19. The method of claim 11, wherein said method continuously produces said solid spherical nanoparticle hydrides.

20. The method of claim 11, said method further comprising collecting said solid spherical nanoparticle hydrides as a dry powder or a suspension of said solid spherical nanoparticle hydrides.

* * * * *